March 10, 1925.

A. MOORHOUSE 1,528,839

BRAKE FOR MOTOR VEHICLES

Filed Oct. 2, 1922

INVENTOR
Alfred Moorhouse
BY
ATTORNEY

Patented Mar. 10, 1925.

1,528,839

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

BRAKE FOR MOTOR VEHICLES.

Application filed October 2, 1922. Serial No. 591,701.

*To all whom it may concern:*

Be it known that I, ALFRED MOORHOUSE, a citizen of the United States, and resident of Detroit, Wayne County, State of Michigan, have invented certain new and useful Improvements in Brakes for Motor Vehicles, of which the following is a specification.

This invention relates to motor vehicles, and more particularly to motor vehicle brakes, and it has for its principal object to provide a brake mechanism which shall compensate for differential expansion of the brake elements under heat, to secure a more uniform braking effect and to prevent locking or sticking of the brakes caused by such expansion.

Other structural features of the invention will be apparent from the subjoined description, taken in connection with the accompanying drawing, in which—

Figure 1:
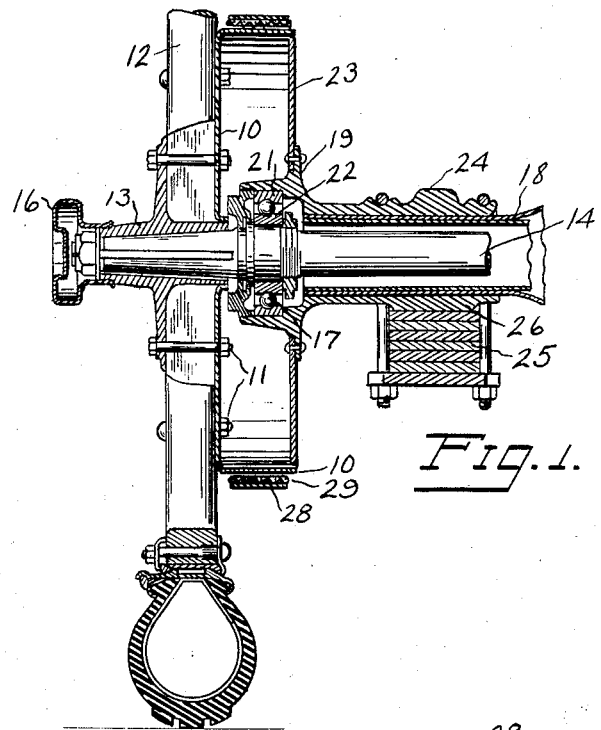
Fig. 1 is a view, partially in section and partially in elevation, of apparatus embodying the invention.

The retardation of a moving vehicle is usually accomplished by the absorption of its kinetic energy in its brakes, with an attendant generation of heat. The amount of heat so liberated may be sufficient, under certain circumstances, to cause a considerable expansion of the brake elements, particularly of the brake drum, the heat absorbing capacity of which is necessarily limited and which is so inclosed and shielded by other parts of the mechanism as to prevent efficient radiation. The brake band is usually much more efficiently cooled by virtue of its exposed portion and large cooling surface, so that there results a differential expansion between these members. This may easily take up all the clearance between the drum and the brake facing, which is necessarily quite small, so that with the brake pedal in fully released position a powerful braking effect is still exerted on the vehicle. Under conditions such that the temperature rise is rapid, as for example, when the vehicle is heavily braked while traveling at high speed, this thermal braking effect may be sufficient to lock the wheels, resulting in serious injury to the vehicle, and great danger to its occupants.

By this invention is provided means to compensate for the unequal expansion of the brake elements so that the braking effect due thereto may be prevented, and the dangerous wheel locking be obviated.

In the accompanying drawing is shown a brake drum 10 of conventional design, attached by bolts 11 to a motor vehicle road wheel 12. The wheel 12 has a hub portion 13 which is keyed in the usual manner to the tapered outer end of an axle shaft 14, and is provided with a suitable hub cap 16. The shaft 14 is journaled in an appropriate bearing 17 in a tubular axle housing 18 to which is affixed, at the outer end, an annular flange member 19. The flange member 19 carries the outer race 21 of the bearing 17, the inner race of which is suitably secured to the shaft 14. Each of the bearing races 21 and 22 is secured against axial displacement in any well known manner. The flange member 19 also supports a cover plate 23, by which dirt and water are excluded from the interior of the drum 10. A tubular extension 24 on the flange member 19 carries a spring pad 26 and the coacting vehicle spring 27, from which the vehicle is supported.

The peripheral surface of the drum 10 is nearly surrounded by a brake band 28, to the inner surface of which a strip of suitable brake facing 29 is secured, in any appropriate manner, as by the rivets 31. The ends of the brake band 28 terminate a short distance apart slightly below the horizontal diameter of the drum, and the midpoint of the band 28 is supported by a bracket 32, provided with an adjustable releasing spring and attached to the cover plate 23 in any convenient way. (Not shown.)

The ends of the brake band 28 are provided with lugs 33 by means of which they are connected, in the usual manner, through the lever 34 and the adjustable link 36, to the conventional brake rod mechanism and pedal, located on the vehicle. (Not shown.) It will be understood that the link 36 and the lever 34 constitute a toggle mechanism, through which the lugs 33, and consequently the ends of the band 28, are drawn together with increasing force upon successive increments of movement of the top of the lever 34 to the right, thus applying the brakes.

The clearance between the drum 10 and the brake facing 29, when the brake mechanism is in its normal running position, is kept as small as possible, and in practice may be within $\frac{1}{32}$ inch. It will be seen that the linear expansion of the drum 10, which is usually a steel stamping, need only be about $\frac{3}{32}$ inch to take up substantially all the clearance, since the expansion of the band 28 is negligible. By this invention the brake band 28 is constructed of a material such as brass or bronze which has a coefficient of linear expansion much greater than that of the steel drum, and still has the requisite strength.

In operation, the brake drum 10, under long continued or exceptionally heavy braking loads, becomes excessively hot and expands towards the limits permitted by the inner diameter of the brake facing 29 in its position of full release. As the temperature of the drum rises, more and more heat is transferred by conduction through this facing to the brake band 28. Because of its relatively large coefficient of expansion, a much smaller increase in temperature will produce a given increase in length of the band than of the drum circumference, and accordingly the drum expansion will never be sufficient to cause any material pressure against the brake facing.

Figure 3:
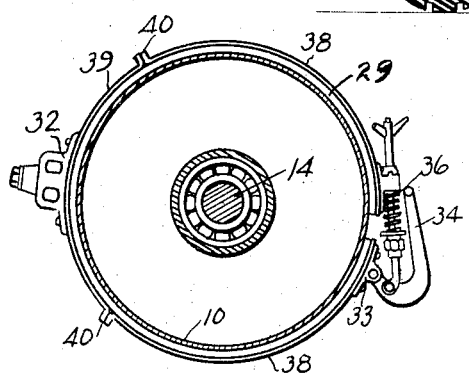
Fig. 3 is a view, similar to Fig. 2, illustrating a modification thereof.
Figure 2:
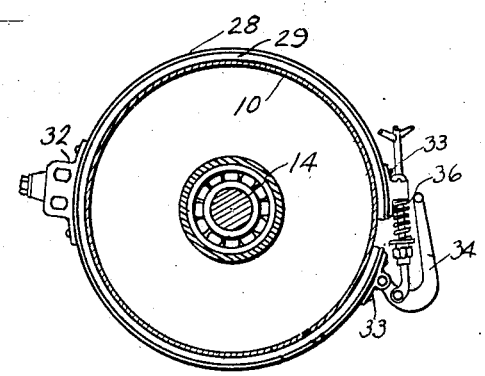
Fig. 2 is a side elevation, partially in section, of the brake apparatus illustrated in Fig. 1.
Figure 4:
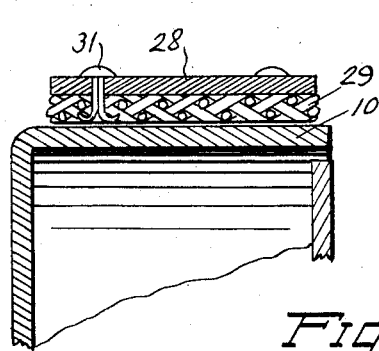
Fig. 4 is an enlarged sectional detail of a portion of the mechanism.

In Fig. 3 is illustrated a modification of my device in which the brake band is formed in sections, the principal sections 38 composed of steel, being joined by a section 39 of brass or other material of high expansion. The sections 38 and 39 may be joined in any suitable manner, as by welding, as indicated at the joints 40. In a similar manner, the sections 38 may, if preferred, be constructed of brass and the section 39, of steel.

While the invention has been shown in but one form, it will be obvious to those skilled in the art that it is not so limited, but is susceptible of various other changes and modifications, without departure from the spirit thereof, and it is desired, therefore, that only such limitations be placed thereupon as are imposed by the prior art or as are specifically stated in the applicant's claims.

What is claimed is:

1. In combination with a motor vehicle, a brake mechanism comprising a drum, brake facing encircling the drum, and a brake band having a greater coefficient of heat expansion than said drum encircling said brake facing.

2. In a motor vehicle brake mechanism, a brake drum and a brake band having a greater coefficient of heat expansion than said drum.

3. In a motor vehicle brake mechanism, a brake drum, brake facing adapted to bear against the periphery thereof, and a brake band adapted to contract said facing against the drum, and having a heat coefficient of expansion greater than said drum.

4. In a motor vehicle brake mechanism, a brake drum, a brake band encircling the drum and provided with brake facing adapted to be pressed thereagainst, means to contract the band to press the facing against the drum, and means connecting the band to said contracting means, said band having a coefficient of expansion greater than the drum.

5. In a motor vehicle brake mechanism, a brake drum, and a brake band adapted for compressive co-action with said drum and provided with a section composed of material having a greater coefficient of heat expansion than said drum.

6. In a motor vehicle brake mechanism, the combination of means to compensate for braking effect caused by unequal expansion of the parts of said mechanism under heat, comprising a brake drum of ferrous material and a coacting brake band of non-ferrous material having a greater coefficient of expansion than said drum.

7. A contracting brake band for motor vehicles having a linear coefficient of expansion greater than its associated brake drum.

8. A motor vehicle brake mechanism comprising a drum, and a brake band having an element adapted to expand more rapidly than said drum.

9. In a brake mechanism, the combination of a brake drum and a brake band so constructed that under operating conditions the band will expand more rapidly than the drum.

In testimony whereof I affix my signature.

ALFRED MOORHOUSE.